US008213963B2

(12) United States Patent
Lee et al.

(10) Patent No.: US 8,213,963 B2
(45) Date of Patent: Jul. 3, 2012

(54) NETWORK BASED LOCATION MEASUREMENT METHOD AND SYSTEM USING PCELL DATABASE

(75) Inventors: Hoon-Ju Lee, Gyeonggi-do (KR); Jung-Woo Lee, Seoul (KR); Kwan-Seok Lee, Gyeonggi-do (KR)

(73) Assignees: SK Telecom Co., Ltd. (KR); SK Planet Co., Ltd. (KR)

( * ) Notice: Subject to any disclaimer, the term of this patent is extended or adjusted under 35 U.S.C. 154(b) by 1051 days.

(21) Appl. No.: 12/088,596

(22) PCT Filed: Oct. 4, 2006

(86) PCT No.: PCT/KR2006/004011
§ 371 (c)(1),
(2), (4) Date: Jun. 17, 2008

(87) PCT Pub. No.: WO2007/040351
PCT Pub. Date: Apr. 12, 2007

(65) Prior Publication Data
US 2008/0287140 A1   Nov. 20, 2008

(30) Foreign Application Priority Data

Oct. 5, 2005  (KR) .................. 10-2005-0093445
May 12, 2006  (KR) .................. 10-2006-0043091

(51) Int. Cl.
*H04W 24/00*   (2009.01)
(52) U.S. Cl. ............... 455/456.5; 455/456.1; 455/456.2
(58) Field of Classification Search ....... 455/456.1–457, 455/446–449, 443, 444
See application file for complete search history.

(56) References Cited

U.S. PATENT DOCUMENTS 6,108,556 A   8/2000  Ito
(Continued)

FOREIGN PATENT DOCUMENTS

CN   1622650 A   6/2005
(Continued)

*Primary Examiner* — George Eng
*Assistant Examiner* — Nam Huynh
(74) *Attorney, Agent, or Firm* — Baker & Hostetler LLP

(57) ABSTRACT

The present invention provides a network-based location measurement method using a pCELL database, comprising the steps of establishing a pCELL database in which a location measurement service target area is divided into lattices each having a predetermined size; continuously determining whether a request for location measurement occurs by a service subscriber; and, when the request for location measurement is generated, comparing fundamental information received from a mobile terminal with the pCELL database, determining a matching pCELL, and reporting the pCELL to the service requester. Furthermore, the present invention is constructed to periodically update a initially established pCELL database using the results of A-GPS-based location measurement and reflect variation in BTSs within a mobile communication network to the pCELL database, thereby always maintaining the optimal database. The present invention contributes to the activation of location-based services by resolving problems related to stability of location measurement due to relays, and the degrading of accuracy of location measurement in a network-based location measurement method in a mobile communication system. Furthermore, the present invention improves the service usage rate of indoor subscribers, occupying about 70% of overall location measurement attempts and service quality and minimizes the need for human and physical resources upon initial commercialization and optimization by resolving the problem due to the considerable amount of human and physical resources required upon initial commercialization and optimization. Therefore, it is possible to replace A-GPS-based location measurement with relatively small costs.

24 Claims, 8 Drawing Sheets

U.S. PATENT DOCUMENTS

| | | | |
|---|---|---|---|
| 6,317,605 B1 * | 11/2001 | Sakuma | 455/457 |
| 6,600,728 B1 | 7/2003 | Choi | |
| 7,397,424 B2 * | 7/2008 | Houri | 342/357.31 |
| 2002/0025822 A1 * | 2/2002 | Hunzinger | 455/456 |
| 2006/0063537 A1 * | 3/2006 | Lee et al. | 455/456.1 |

FOREIGN PATENT DOCUMENTS

| | | |
|---|---|---|
| KR | 1020040067533 | 7/2004 |
| KR | 100536187 | 12/2005 |
| KR | 100564728 | 3/2006 |

* cited by examiner

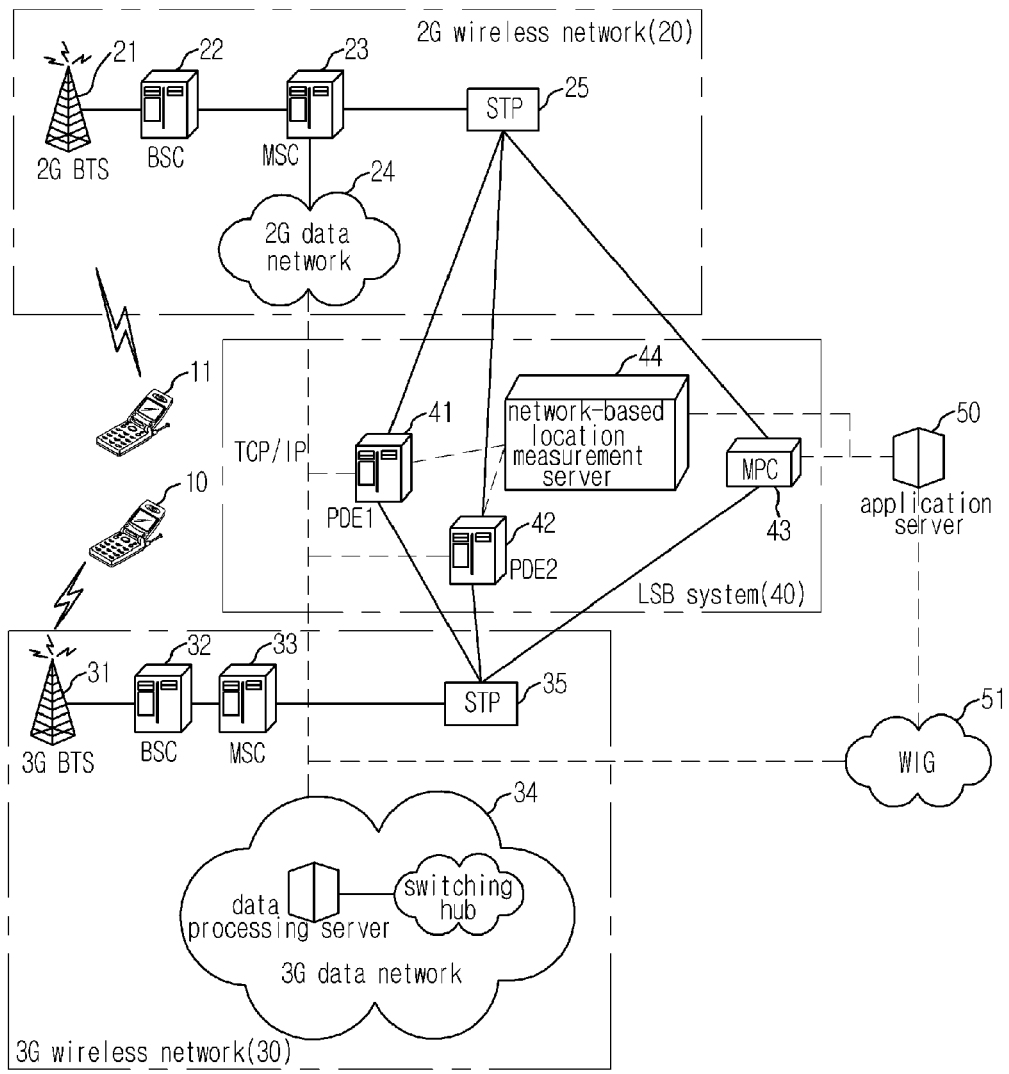
[Fig. 1]
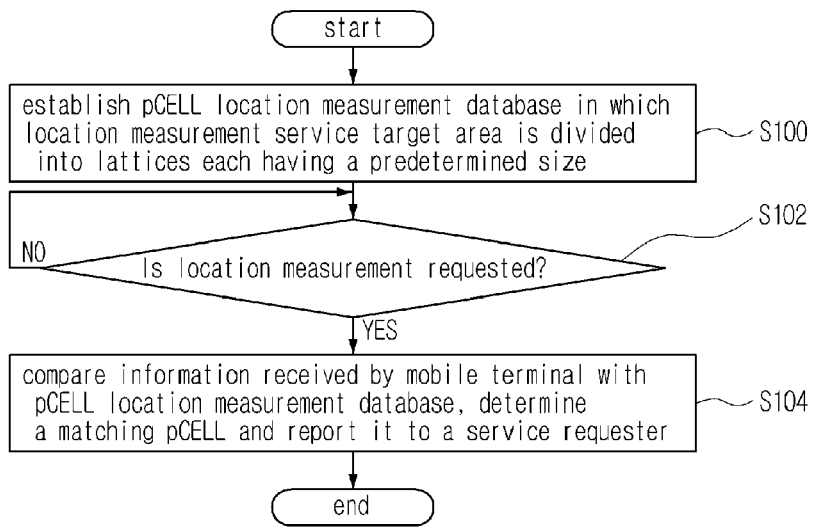
[Fig. 2]

[Fig. 3]
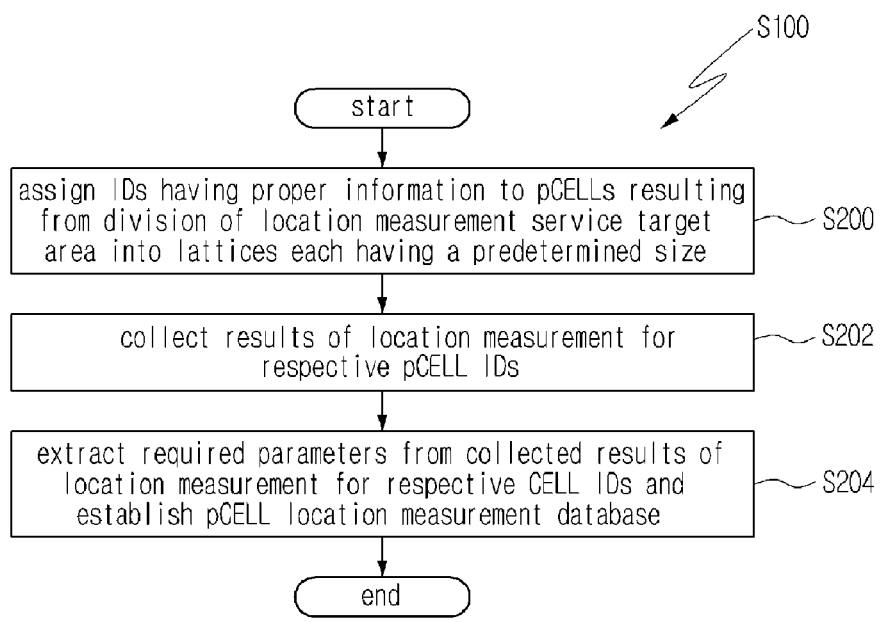
[Fig. 4]
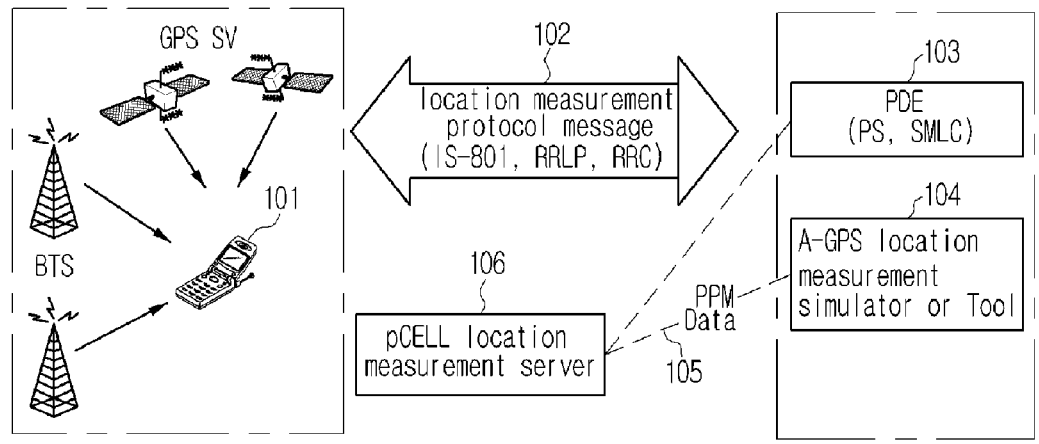
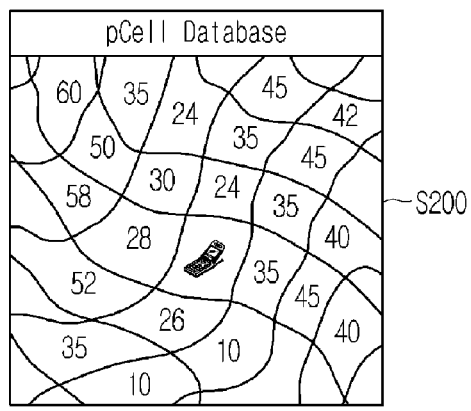

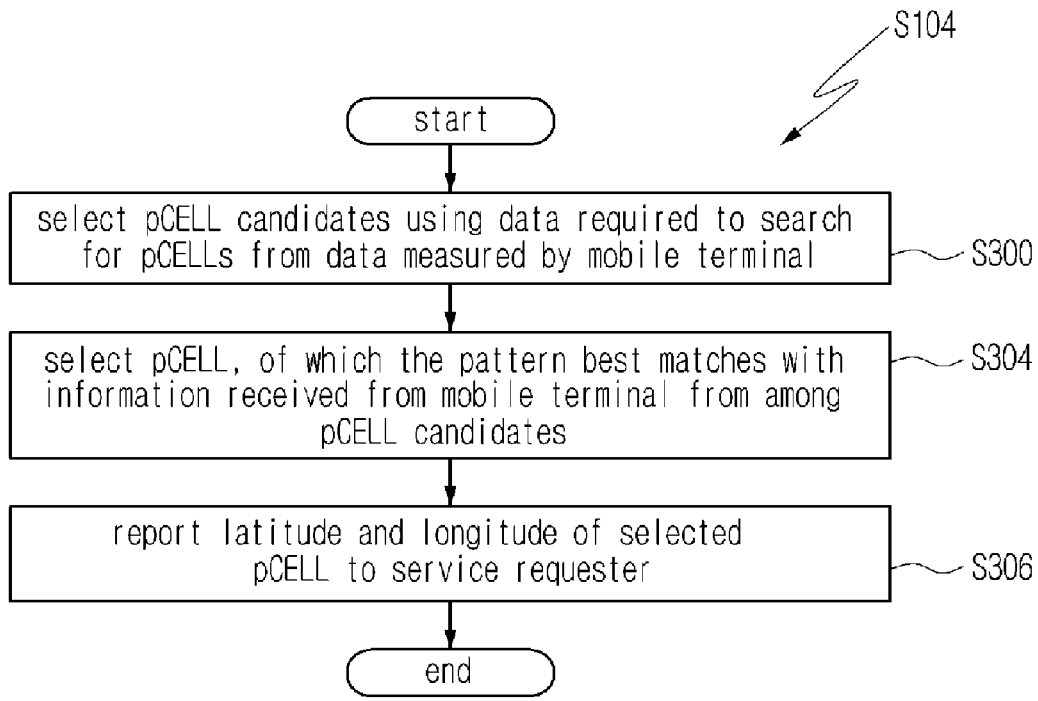
[Fig. 5]
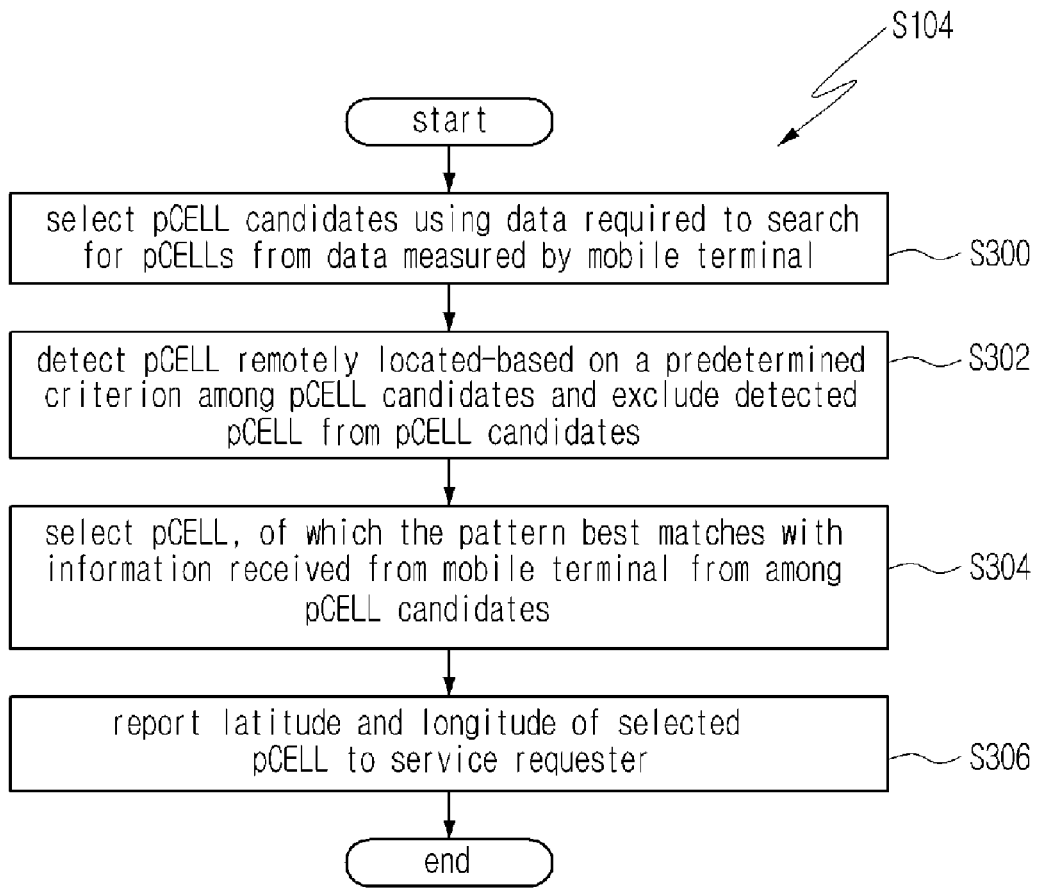
[Fig. 6]

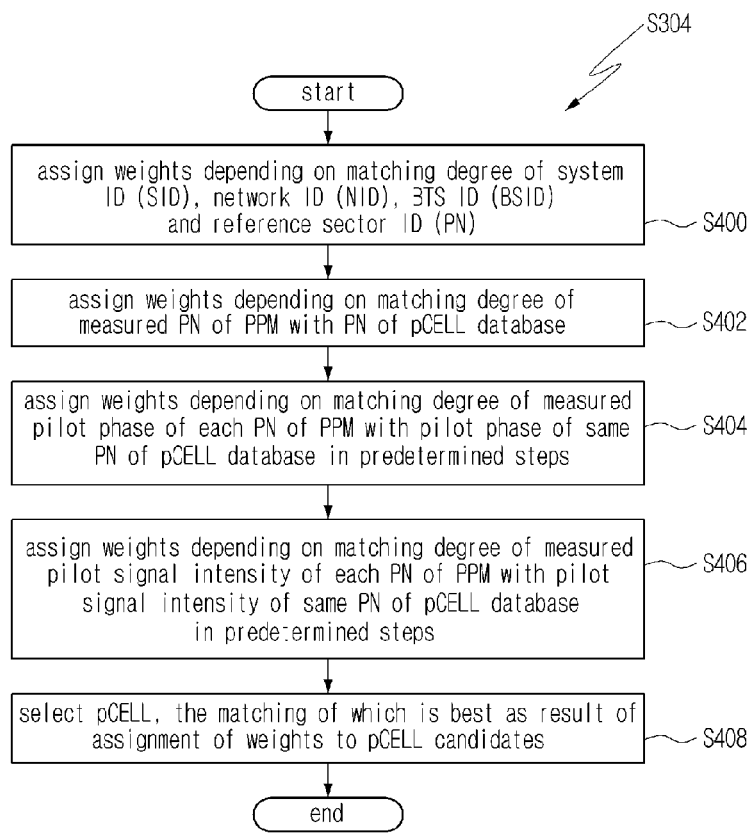
[Fig. 7]
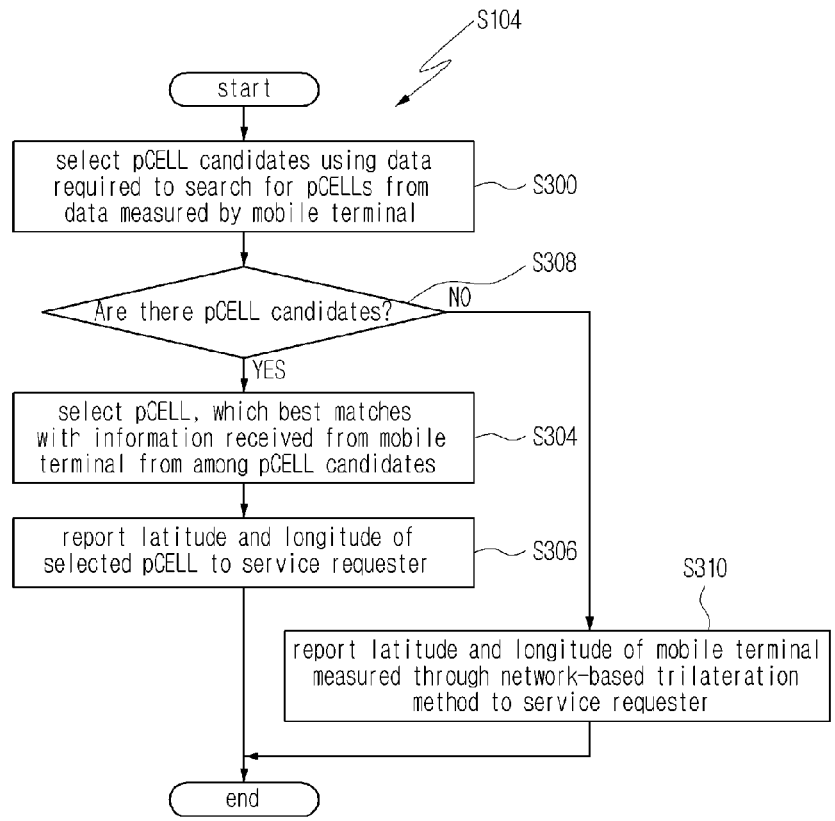
[Fig. 8]

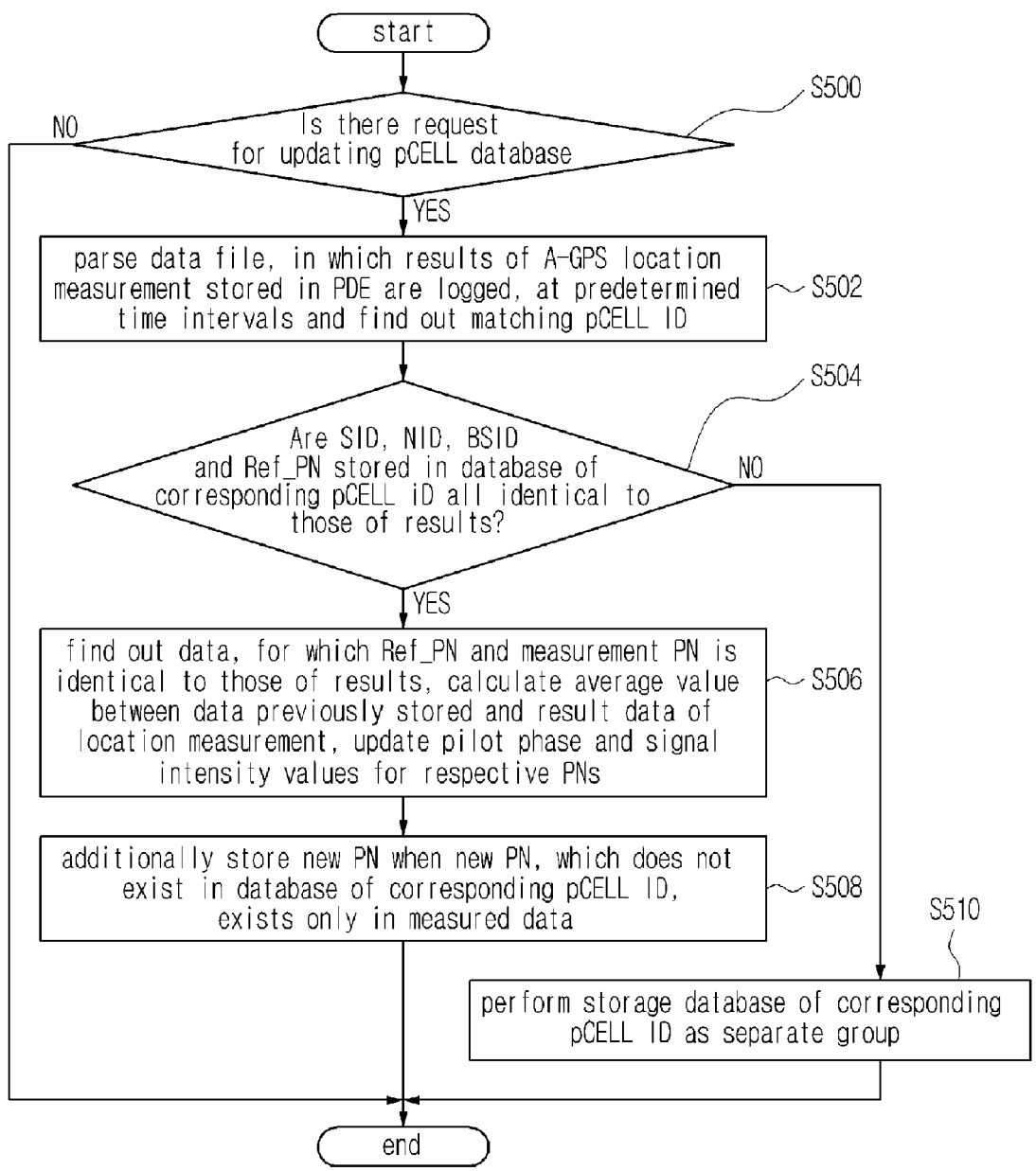
[Fig. 9]

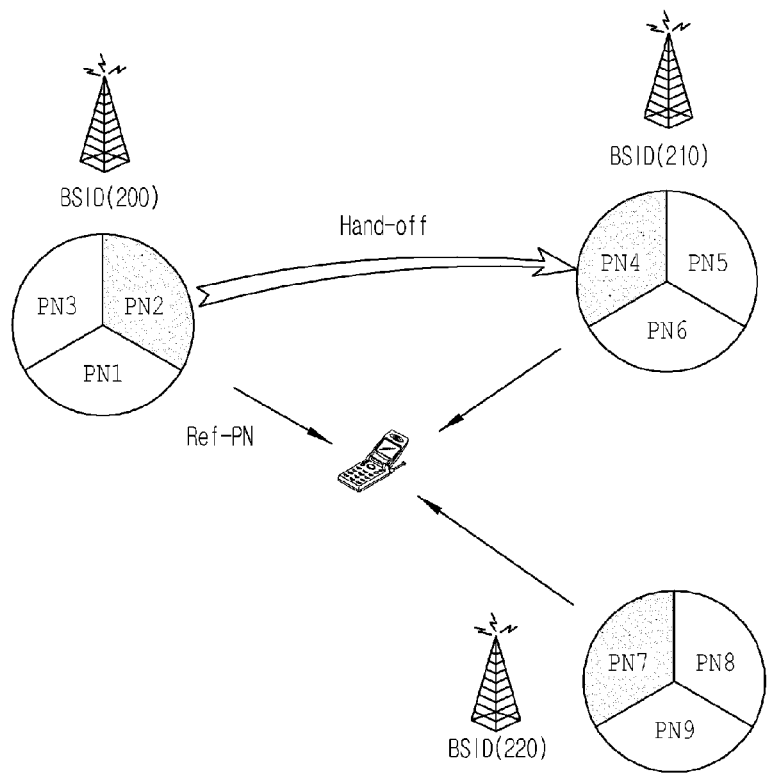

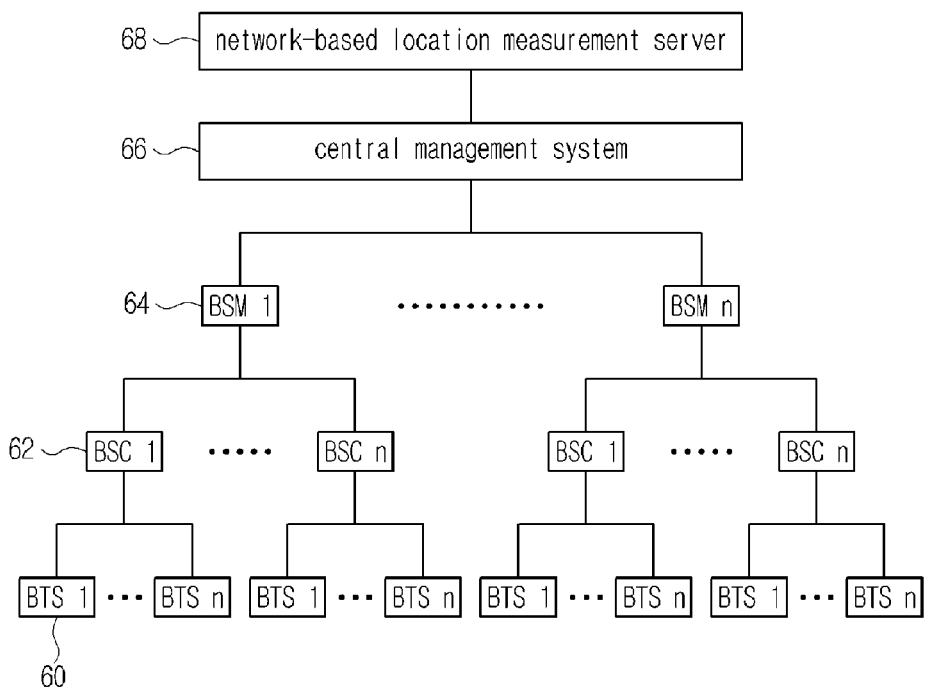

[Fig. 14]
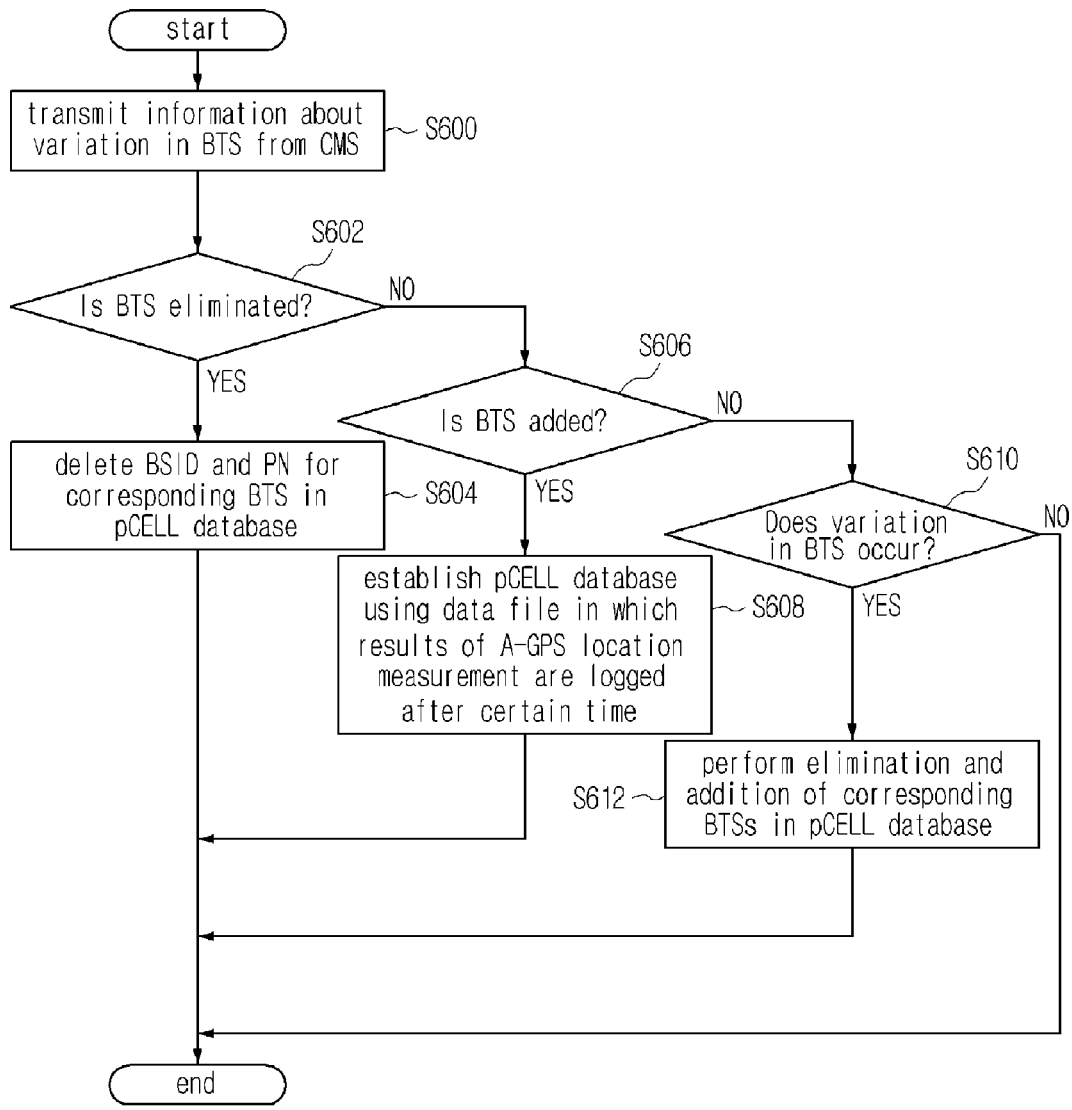

NETWORK BASED LOCATION MEASUREMENT METHOD AND SYSTEM USING PCELL DATABASE

TECHNICAL FIELD

The present invention relates to a network-based location measurement technology provided in a mobile communication network.

BACKGROUND ART

Technologies of measuring locations for provision of Location-based Services (LSB) are divided into a network-based method of determining locations according to software using a propagation environment which is the cell radius of the base transceiver station of a mobile communication network in order to measure the location of a mobile terminal, a handset-based method using a Global Positioning System (GPS) receiver mounted in a mobile terminal and a hybrid method in which the above-described two methods are mixed.

The handset-based methods include an Assisted GPS (A-GPS) method and an Enhanced Observed Time Difference (E-OTD) method.

The A-GPS is a method available in both European GSM-based network technology using a TDMA radio access method and IS-95-based network technology using a CDMA radio access method. In the CDMA radio access method, the location of a mobile terminal is determined using the transmission and reception of messages via an IS-801-1 interface between the mobile terminal having a GPS receiver and the PED of a CDMA network. In this case, the number of signals received from GPS satellites is 4 or more, so that the location determination is very accurate. A-GPS includes a PDE for receiving the satellite signals received by the mobile terminal and calculating the location thereof and a mobile positioning center (MPC) for performing calculation using information about base transceiver stations within a mobile communication network or linking it to another system.

E-OTD (enhanced observed time difference) method has been standardized by a GSM standard committee for a European TDMA-based GSM method through LCS Release 98 and 99. A mobile terminal calculates relative arrival times and the difference between distances-based on signals received from three or more base transceiver stations and then determines a location. The E-OTD method mixes an OTD (observed time difference) method, an RTD (real time difference) method, and a GTD (geometric time difference) method and uses a mixture of the methods. The OTD method calculates the arrival times of signals from two base transceiver stations to a mobile terminal, and the RTD method calculates the distance between transmission start times of signals from two base transceiver stations. Furthermore, the GTD method calculates the distances between two base transceiver stations and a terminal and then calculates the difference between the distances for two base transceiver stations.

The network-based location measurement technology delivers data (PPM, OTD, etc.) measured by a terminal-based on protocols (IS-801, RRLP, RRC, etc.) agreed between a mobile terminal and a server to a location measurement server, and the location measurement server performs a function of measuring the location of the corresponding mobile terminal using the measured data (PPM, OTD, etc.). The location measurement server performs network-based location measurement (method of measuring the location of a terminal requesting location measurement by a server except for a method of measuring location using GPS satellites), and transmits the results thereof to a requester (MPC, CP (Contents Provider) or a terminal requesting a service) requesting location measurement.

Such a network-based location measurement technology includes a cell ID method using the radius cell of a base transceiver station, an angle of arrival (AOA) method of calculating locations by calculating the Line Of Bearing (LOB) in a base transceiver station while the base transceiver station receives signals transmitted from a mobile terminal, a TOA (time of arrival) method of calculating locations in a mobile terminal using the arrival time of radio waves emitted from three or more base transceiver stations, and a TDOA (time difference of arrival) method of determining a point at which two hyperbolas, which are acquired by measuring the difference between the arrival times of pilot signals received from three base transceiver stations in a mobile terminal and calculating the distance difference between base transceiver stations, intersect as the location of a mobile terminal.

Using such a conventional network-based location measurement method using has the following problems.

First, when trilateration is performed using time and distance measurement data which are parameters measured by a mobile terminal or a mobile communication network, or the intersection point of hyperbolas is calculated, the relay has a great influence. That is, upon use of the relay, the time and distance data between a base transceiver station and a terminal measured by the terminal is delayed compared to the original data, so that there is a problem in that the accuracy of location measurement is reduced.

Second, since the latitude and longitude data of a base transceiver station is not reflected immediately upon the rearrangement of the base transceiver station, so that there is a problem in that considerable error is caused in the accuracy of the latitude and longitude data referred in principal.

Third, since characteristics are different depending on network-based location measurement technologies or base transceiver stations and sectors, considerable human and physical resources are required in a process of optimizing parameters used differently for base transceiver stations and sectors to increase the accuracy of location measurement, so that there is a problem in that commercialization is different.

Therefore, conventional network-based location measurement technology uses a location measurement method having considerable problems in which errors of up to hundreds of m~several Km occur depending on whether there is a relay, or whether optimization is completed.

DISCLOSURE OF INVENTION

Technical Problem

Accordingly, the present invention has been made keeping in mind the above problems occurring in the prior art, and an object of the present invention is to provide a network-based location measurement method and system, which improves the accuracy of location measurement while the problem related to the influence of relays is resolved and the need for human and physical resources is reduced upon commercialization.

Technical Solution

In order to accomplish the above object, the present invention provides a network-based location measurement method using a pCELL database, comprising the steps of (a) establishing a pCELL database in which a location measurement service target area is divided into lattices each having a predetermined size, (b) continuously determining whether a request for location measurement occurs by a service subscriber; and (c) when the request for location measurement is generated, comparing fundamental information received from a mobile terminal with the pCELL database, determining a matching pCELL, and reporting the matching pCELL to the service subscriber.

The network-based location measurement method using a pCELL database may be recorded as a predetermined program in a recording medium which is readable by a computer.

Additionally, in order to accomplish the above object, the present invention provides a network-based location measurement system, including a mobile terminal for being a target for a request of location measurement and transmitting results of location measurement for a current location thereof through a predetermined protocol in a mobile communication network; a location calculation server for receiving the results of location measurement by the mobile terminal or the mobile communication network and performing location calculation; and a pCELL location measurement server for establishing location measurement databases of pCELLs resulting from division of a location measurement service target area into lattices each having a predetermined size using results of location calculation, comparing location measurement information received from the mobile terminal with the pCELL databases when a request for location measurement occurs, and providing location information of a matching pCELL to a requester for location measurement.

Advantageous Effects

The above-described network-based location measurement method and system using pCELL databases have the following advantages.

The present invention contributes to the activation of location-based services by resolving problems related to stability of location measurement due to relays, and the degrading of accuracy of location measurement in a network-based location measurement method in a mobile communication system.

Furthermore, the present invention improves the service usage rate of indoor subscribers occupying about 70% in overall location measurement attempts and service quality and minimizes human and physical resources upon initial commercialization and optimization by resolving the problem due to the considerable amount of human and physical resources required upon initial commercialization and optimization. Therefore, it is possible to replace A-GPS-based location measurement with relatively small costs.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram showing the schematic construction of a network-based location measurement system using a mobile communication network according to the present invention;

FIG. 2 is a flowchart illustrating a network-based location measurement method using a pCELL database according to a preferred embodiment of the present invention;

FIG. 3 is a flowchart illustrating a preferred embodiment of step S100 of FIG. 2 for establishment of the pCELL database;

FIG. 4 is a basic conceptual diagram illustrating a location measurement system in which the network-based location measurement method using the pCELL database of the present invention is implemented;

FIG. 5 is a flowchart illustrating a preferred embodiment of step S104 of FIG. 2;

FIG. 6 is a flowchart illustrating a more preferred embodiment of step S104 of FIG. 2;

FIG. 7 is a flowchart illustrating a preferred embodiment of step S304 of FIGS. 5 and 6;

FIG. 8 is a flowchart illustrating another more preferred embodiment of step S104 of FIG. 2;

FIG. 9 is a flowchart illustrating a process of updating the pCELL database according to the present invention;

FIG. 10 is a basic conceptual diagram illustrating the updating process of FIG. 9;

FIG. 11 is a diagram illustrating an embodiment of the updating process of FIG. 9;

FIG. 12 is a diagram illustrating another embodiment of the updating process of FIG. 9;

FIG. 13 is a diagram illustrating the construction of a system for a process of reflecting variation in a base transceiver station to the pCELL database; and FIG. 14 is a flowchart illustrating the process of reflecting variation in a base transceiver station to the pCELL database.

BEST MODE FOR CARRYING OUT THE INVENTION

The basic concept of the present invention is to provides a simple and accurate network based location measurement method and system which establish the database of location measurement data having highest location measurement accuracy, search the database, selects an optimal database upon request of location measurement and provides it to a request terminal and a service request entity.

LSB refers to a technology of measuring the locations of mobile terminals using mobile communication networks or location measurement satellites (GPS) and providing a variety of information services. LSB is implemented by integrating a technology of measuring the locations of mobile terminals, a mobile communication network technology of transmitting the information of mobile terminals through base stations, LBS platform technology, and/or various LBS application technologies.

The mobile communication network technology uses single synchronization as existing CDMA technology which is synchronous scheme based on GPS and, therefore, is very effectively used for determination of mobile terminals' locations based on time offset. A Mobile Switching Center (MSC), a Mobile Positioning Center (MPC), a Positioning Determining Entity (PDE) works together each other, so that accurate information is provided to a requester for location information through a LBS system.

The LBS platform technology is composed of location-based information, location information management, authentication and security, profile management, and provides services in conjunction with location-based information services which is LBS application technology, map and sightseeing information, m-commerce through a common Application Processor Interface (API).

Reference now should be made to the drawings, in which the same reference numerals are used throughout the different drawings to designate the same or similar components.

FIG. 1 is a diagram illustrating an example of the construction of a network-based location measurement system using mobile communication networks according to the present invention.

Mobile terminals 10 and 11 collect pieces of fundamental data for network-based location measurement and provide the fundamental data to location calculation servers 41 and 42.

In this case, the pieces of fundamental data collected by the mobile terminals 10 and 11 include information about a system currently providing services, pilot signals from neighboring base transceiver stations, signal intensity (Ec/Io), or the like. The information about a system currently providing services include a System ID (SID), a Network ID (NID), a Base transceiver station ID (BSID), the sector number (Ref_PN) of a base transceiver station currently providing services, a pilot phase included in the Ref_PN, signal intensity, and the like. Furthermore, the pilot signal of a neighboring base transceiver station includes distance data and time data, such as the sectors numbers (Measurement PNs) of the neighboring base transceiver stations collected by the mobile terminals 10 and 11, pilot phases included in respective measurement PNs, signal intensity, and the like.

In this case, location calculation servers 41 and 42 are implemented using PDEs (position determination entities) in a synchronous CDMA (code division multiple access) method, PSs (Position Servers) in an asynchronous W-CDMA (wideband code division multiple access) method and SMLCs (Serving Mobile Location Centers) in a GSM (global system for mobile communication) method.

The PDE is a server which performs location measurement using satellites and a network-based location measurement function using a trilateration method in CDMA. The PS is a server which performs location measurement using satellites and a basic cell-based location measurement function in w-CDMA. The SMLC is a server which performs location measurement using satellites and a cell-based location measurement function in GSM.

For the interworking between the mobile terminals 10 and 11 and location calculation servers 41 and 42, the matching of protocols (CDMA:IS-801, GSM:RRLP, W-CDMA:RRC) for location measurement is performed using mobile communication systems 20 and 30 as connection paths. A mode of performing the protocols is divided into a DBM (Data Burst Message) mode and a TCP/IP mode.

In the DBM mode, the mobile terminals 10 and 11 communicate with the PDE (PS, SMLC) through the base transceiver stations (BTS) 21 and 31, base station controllers (BSC) 22 and 23 and mobile switching centers (MSC) 23 and 33 of a mobile communication system of playing a role as an intermediate path.

In the TCP/IP mode, the mobile terminals are interworking with the PDEs 41 and 42 in a TCP/IP manner through the BTSs 21 and 31, BSCs 22 and 32 of the mobile communication system, and data networks 24 and 34.

Each of the PDEs (PS, SMLC) 41 and 42 performs a location measurement function using satellites in conjunction with the mobile terminals 10 and 11.

Each of the PDEs (PS, SMLC) 41 and 42 delivers PPM (Pilot Phase Measurement) data received from the terminals 10 and 11 to the network-based location measurement server 44.

In the present invention, the location measurement server 44 stores a pilot cell (hereinafter referred to as a pCELL) previously established. The location measurement server 44 extracts location related location measurement data from the PPM data, searches the pCELL database using the data and selects a pCELL, the data of which matches best, from among the pCELLs of the database and uses the result thereof as the network-based location measurement result of the present invention.

The MPC 43 and the application server 50 are servers for processing the result data transmitted as the location measurement result by the PDEs 41 and 42 and the network-based location measurement server 44. The application server 50 may be working with a data network through a WIG (wireless internet gateway) 51.

FIG. 2 is a flowchart illustrating a network-based position measurement method using a pCELL database according to a preferred embodiment of the present invention. The position measurement method of FIG. 2 can be performed in the pCELL position measurement server 106 of FIG. 4.

First, a pCELL database, which is the base of the position measurement method of the present invention is established at step S100. That is, the pCELL database in which a location measurement service target area is divided into lattices each having a predetermined size.

Next, whether a request of position measurement occurs is continuously determined at step S102.

When the request for position measurement occurs, pieces of information transmitted from a mobile terminal, for example, PPM information and latitude and longitude data in the case of CDMA are compared with those of the established pCELL database. Furthermore, a matching pCELL is determined and the latitude and longitude data thereof is reported to a service requester at step S104.

FIG. 3 is a flowchart illustrating a preferred embodiment of step S100 of FIG. 2 for establishment of the pCELL database.

First, in order to establish the characterized pCELL database of the present invention, a position measurement service target area is divided into lattices each having a predetermined size. Each of the lattices is defined as a pCELL, and is assigned an ID having unique information at step S200. In this case, the unique information of the pCELL ID may include the latitude and longitude data of the central point of each lattice. In this case, the size of each lattice is determined by dividing the service target area into for example, 100×100 m, 50×50 m, 25×25 m, or the like, depending on required specification for the accuracy of location measurement.

Furthermore, the results of location measurement for respective pCELL IDs are collected at step S202. The results of location measurement are PPM data received by the mobile terminal and latitude and longitude data which are the results of cell location measurement (the results of A-GPS or network-based location measurement).

In step S202, the results of location measurement of a requester for a satellite location measurement service currently being provided may be logged and the results of location measurement of a requester for a network location measurement service currently being provided may be logged.

In step S202, if the data of satellite location measurement currently being provided is used, PPM data is received from the PDE whenever the cell location measurement of LBS (Location-based Service) is performed, satellite calls, the location accuracies of which are preferred are logged as a separate file and then the results of location measurement can be collected.

In step S202, results, the location accuracies of which are preferred, are selected from among the results of location measurement using a satellite location measurement apparatus (simulator) and then the related log file may be generated.

Furthermore, in step S202, the results of satellite location measurement requested by a person for a predetermined region or simultaneously requested by several persons are selected and then a related log file may be generated. Furthermore, in step S202, data, the location measurement results of which are preferred, are selected among the results of network-based location measurement and a related log file may be generated in equipment currently providing commercial services.

Furthermore, required parameters are extracted from the results of location measurement for collected respective pCELL IDs and then the pCELL database is established at step S204. In step S204, program parsing is performed in order to extract required parameters in the log file made in a file type and then a separate data file is generated. Furthermore, the ranges of latitude and longitude of a lattice-shaped pCELL are compared with the latitude and longitude which are the result data of location measurement for each LBS call of a data file generated as the results of the parsing, and a database table, the elements of which are PPM data measured by the terminal upon the LSB call for the pCELL lattice most included in the range is generated. When all the parsing result data is stored in the database table, step S204 is terminated.

FIG. 4 is a diagram illustrating the basic conception of a location measurement system in which the network-based location measurement method use the pCELL database of the present invention.

A mobile terminal 101 works together with a PDE (PS, SMLC) 103 using a location measurement protocol (IS-801, RRLP, or RRC) 102.

In this case, the PDE 103 receives satellite data from a standard satellite reception device mounted therein and performs the location measurement using the satellites of the mobile terminal 101 requesting location measurement. Satellite data providing appropriate location measurement accuracy is only selected from among the results of location measurement using satellites. In this case, the appropriate location measurement accuracy is determined depending on whether uncertainty, which is a determination criterion for location accuracy, satisfies a required level among the result data acquired by selecting a predetermined number of satellites or more and performing location measurement.

Furthermore, the PDE 103 delivers latitude and longitude data, which is the results of location measurement, and the PPM data received from the mobile terminal 101 to the pCELL location measurement server 106.

In a CDMA system, the PPM data (SFN (System Frame Number)-observed time difference or UE RX-TX time difference data in a W-CDMA system) includes system information measured by the mobile terminal 101 and time and distance information of neighboring base transceiver stations. In this case, the pieces of fundamental data collected by the mobile terminals 10 and 11 include information about a system currently providing services, pilot signals from neighboring base transceiver stations, signal intensity (Ec/Io), or the like. The information about a system currently providing services include a System ID (SID), a Network ID (NID), a Base transceiver station ID (BSID), the sector number (Ref_PN) of a base transceiver station currently providing services, a pilot phase included in the Ref_PN, signal intensity, and the like. Furthermore, the pilot signal of a neighboring base transceiver station includes distance data and time data, such as the sectors numbers (Measurement PNs) of the neighboring base transceiver stations collected by the mobile terminals 10 and 11, pilot phases included in respective measurement PNs, signal intensity, and the like.

The pCELL location measurement server 106 continuously establishes the pCELL database used in the present invention by searching for results of the location measurement and the ranges of latitude and longitude in the pCELL database S200 in which the whole country has been previously divided into basic cells and storing them in an appropriate cell. A process of updating an initially established pCELL database is described below in detail with reference to FIGS. 9 to 12.

It may be possible to select data having the preferred location accuracy among the results of A-GPS location measurement and network-based location measurement (in addition to the results of location measurement using satellites, and applying the data to the pCELL database of the present invention, thereby establishing the pCELL database. In the case of A-GPS location measurement, the data having preferred location accuracy means the results of location measurement if uncertainty is more than a required level when the number of satellites is a predetermined number or more, for example, five or more. Furthermore, in the case of network-based location measurement, the data having preferred location accuracy means the results of location measurement when the number of neighboring cells is a predetermined number or more, for example, four or more, or when a relay is not used in all cells used.

In addition to them, the data having preferred location accuracy is selected from among the results of the satellite-based location measurement requested by satellite measurement equipment (simulator), by a person for a predetermined region or simultaneously requested by several persons and then the pCELL database may be established.

The pCELL location measurement server 106 selects a cell, which matches best with the PPM data delivered from the mobile terminal 101, from among the established pCELL database and provides it to a service requester as the results of location measurement when a request for location measurement occurs from the mobile terminal 101 to the PDE 103.

FIG. 5 is a flowchart illustrating a preferred embodiment of step S104 of FIG. 2.

First, pCELL candidates are selected using data required to search for a pCELL from data measured by the mobile terminal at step S300. That is, a corresponding pCELL database is selected and acquired from among all the pCELL databases using data, such as a mobile communication System ID (SID), a mobile communication Network ID (NID), a Base transceiver station ID (BSID), the sector number (Ref_PN) of a base transceiver station currently providing services, from the PPM data received when the location measurement for a pCELL is requested.

Next, a pCELL, of which the pattern matches best with the information received from the mobile terminal, among the selected pCELL candidates is selected at step S304.

Thereafter, the latitude and longitude of the selected pCELL is reported to the service requester as the results of location measurement.

FIG. 6 is a flowchart illustrating a more preferred embodiment of step S104 of FIG. 2, which is an embodiment in which step S302 is added to the embodiment of FIG. 5.

That is, at step S300, a pCELL, which is remotely located-based on a predetermined criterion, is detected from the selected pCELL candidates and the detected pCELL is excluded from the pCELL candidates at step S302. Furthermore, a pCELL, of which the pattern matches best with the information received from the mobile terminal, is selected from the selected pCELL candidates at step S304. Thereafter, the latitude and longitude of the selected pCELL is reported to the service requester as the results of the location measurement at step S306.

Step S302 is to prevent a problem in which locations are measured to be excessively remote, compared to actual locations, and the examination criteria are, for example, described as the following.

First, it may be possible to examine whether pCELL databases are located remotely from the central point of a cell to exceed a predetermined reference value from the pCELL candidates and then exclude them from the pCELL candidates. In this case, it is possible to differently apply a predetermined reference value depending on the size of cells.

Furthermore, it may be possible to calculate the average distance from the central point of the cell of the pCELL database of the candidates, examine whether pCELL databases are located remotely to exceed the average distance, and then exclude them from the pCELL candidates.

FIG. 7 is a flowchart illustrating a preferred embodiment of step S304 of FIGS. 5 and 6.

At step S304, four criteria for provision of weights which are provided for selecting a pCELL, the pattern matching of which is best are described as follows:

First, weights are assigned depending on the degree of matching of the mobile communication System ID (SID), the mobile communication Network ID (NID), the Base transceiver station ID (BSID), the sector number (Ref_PN) of the base transceiver station currently providing services at step S400.

Next, weights are assigned depending on the degree of matching of the numbers (Measurement PN) of the sectors of neighboring base transceiver station measured of the PPM with the PN stored in the pCELL database at step S402.

Weights are assigned depending on the degree of matching of the pilot phase for each measured PN (including both Ref_PN and Measurement PN) of PPM with the pilot phase of the same PN stored in the pCELL database for predetermined steps at step S404.

Weights are assigned depending on the degree of matching of the measured pilot signal intensity for each PN of PPM with the pilot signal intensity of the same PN stored in the pCELL database for predetermined steps at step S406.

Furthermore, a pCELL, the matching of which is best, are selected as the results of the assignment of the weights to the pCELL candidates at step S408.

Although, in FIG. 7, the embodiment in which the four criteria of steps S400 to S406 are all used is described, the present invention is not limited to them, and those skilled in the art will understand that step S304 can be implemented through any one or the combination of two or more of the criteria for assignment of weights upon the implementation of a location measurement system.

FIG. 8 is a flowchart illustrating another more preferred embodiment of step S104 of FIG. 2, which is an embodiment in which steps S308 and S310 are added to the embodiment of FIG. 5.

The embodiment of FIG. 8 is the embodiment in which a solution for the case in which patterns are not matches with those of the pCELL database upon the request of position measurement of pCELL at a specific location is provided.

The embodiment of FIG. 8 is an embodiment in which a solution for the case in which there is no pattern matching with the pCELL database when the location measurement for a pCELL is requested at a specific location is provided.

First, if, as a result of selection of pCELL candidates using data measured by a mobile terminal at step S300, there is a pCELL candidate, the position measurement of the present invention is completed after passing through steps S304 and S306. Although not shown in drawings, if there are pCELL candidates, the position measurement method of the present invention may be completed after passing through the steps S302, S304 and S306 of FIG. 6.

However, if there is no selected pCELL candidate, the location calculation server (PDE in CDMA, SMLC in GSM, PS in W-CDMA) can use the results of position measurement, which are measured using a trilateration method, if the results are satisfactory in consideration of location accuracy at step S310.

In this case, the trilateration method may be performed using Advanced Forward Link Trilateration (AFLT) in CDMA, using Enhanced Observed Time Difference (E-OTD) in GSM or Observed Time Difference Of Arrival (OTDOA) in W-CDMA.

AFLT which has been standardized by the CDMA standard committee (TR 45.5) acquires the difference between the arrival times of pilot signals transmitted by a service base transceiver station and neighboring base transceiver stations (BTS) and uses a hyperbola concept.

E-OTD method has been standardized by a GSM standard committee for a European TDMA-based GSM method through LCS Releases 98 and 99. A mobile terminal calculates relative arrival times and the difference between distances-based on signals received from three or more base transceiver stations and then determines a location. E-OTD method mixes an OTD (observed time difference) method, a RTD (real time difference) method, a GTD (geometric time difference) method and uses mixture of these methods. The OTD method calculates the arrival times of signals from two base transceiver stations to a mobile terminal, and the RTD method calculates the distance between transmission start times of signals from two base transceiver stations. Furthermore, the GTD method calculates the distances between two base transceiver stations and a terminal and then calculates the difference between the distances for two base transceiver stations.

The OTDOA method determines a position at which two hyperbolas, which are acquired by measuring the difference between the arrival times of pilot signals received from three base transceiver stations by a mobile terminal and calculating the differences between the base transceiver stations, intersect as the location of the mobile terminal.

Furthermore, although not shown in drawings, it may be possible to acquire the central point of a cell in which a position measurement terminal is located and the central points of two adjacent cells, then acquire the central point of the three vertexes, and use it as the result of location measurement.

Furthermore, the results of location measurement having high location accuracy are selected from the results of location measurement measured at step S310 and the results of location measurement using a method of acquiring the central points of three neighboring cells, and can be reported to a service requester. In this case, if the number of the PNs of neighboring cells is more than four, and there is no relay when the distances from a terminal to respective measurement PNs are calculated, location measurement using the trilateration method is selected, and if not, the results of location measurement having high location accuracy can be selected by the method of acquiring the central point of three vertexes.

In the network-based location measurement, what is most problematic is to perform separate optimization for each base transceiver station depending on different environments of actual base transceiver stations, in which considerable resources are required in view of time and labor.

In the present invention, an area in which there in no pCELL database is the area in which optimization is required. In this case, it is possible to easily perform optimization by adding pCELL databases which are empty for respective base transceiver stations using A-GPS location measurement using satellites, location measurement equipment (simulator) and/or manual location measurement by a human being, around the problematic area.

Meanwhile, according to the present invention, it is possible to improve the integrity of databases by periodically updating the pCELL database initially established by a satellite location measurement service using the results of location measurement according to an A-GPS method which are the results of location measurement of the subscriber of a satellite location measurement service method (A-GPS method) which is currently provided, a network-based location measurement service method (E-OTD method, OTDOA method, etc.) or a manual satellite location measurement method.

A process of updating the pCELL database is described in detail with reference to FIGS. 9 to 12. FIG. 9 is a flowchart illustrating a process of updating the pCELL database according to the present invention.

After the initial establishment of the pCELL data base, it is necessary to continuously update the database depending on the degree of generation of A-GPS log files and variation in the situation of a mobile communication network.

The update may be periodically performed-based on the condition that the update time is set by the operator of the network-based location measurement server 44 of FIG. 1, or may be performed one time according to the demand of the operator. The network-based location measurement server checks whether there is a request for the updating of the pCELL database having the above-described type at step S500.

When there is a request for updating the pCELL database, the network-based location measurement server fetches log files of predetermined time intervals determined by updating the time condition among the data files in which the results of A-GPS position measurement by a commercial service subscriber which are stored in the PEDs 41 and 42 of FIG. 1 are logged, performs parsing and then finds out the pCELL ID of the pCELL database matching with it at step S502. Where the satellite location measurement service, which is currently provided is not provided, the results of manual A-GPS location measurement can be used.

Thereafter, the mobile communication ID (hereinafter referred to as SID), the mobile network ID (hereinafter referred to as NID), the base transceiver station ID (hereinafter referred to as BSID) and the sector numbers (hereinafter referred to as "Ref_PN") of a base transceiver station currently providing services stored in the database of the selected pCELL ID are compared with the SID, NID, BSID, Ref_PN of the results of location measurement parsed from the log file at step S504.

If, as a result of comparison, the four parameters are identical to each other, the sector number (Ref_PN) of a base transceiver station currently providing services and the sector numbers (Measurement PN) of the other base transceiver stations collected by the mobile terminal in addition to the Ref_PN are compared with all PNs which have been stored in the database of a corresponding pCELL ID, and the pilot phase and signal intensity values of the result data of location measurement for a matching PN are additionally stored in the pCELL database. The pilot phase and signal intensity values are used as material to calculate reference data to be described below.

Thereafter, average values between pilot phase and signal intensity values for respective PNs previously stored in the pCELL database and pilot phase and signal intensity values for respective PNs of the result data of location measurement are acquired and then are respectively stored in the database of a corresponding pCELL ID at step S506. The data composed of the average values is used as reference data upon actual location measurement in future.

If there are a plurality of pilot phase and signal intensity values for the matching PN within the database of a pCELL ID, the average value of all pilot phase and signal intensity values is calculated and the reference data is updated when the number of pilot phase and signal intensity values is less than a certain number, for example, 6. If the number of pilot phase and signal intensity values is more than 6, the average value of the remaining values, excluding values which are outside, for example, the range of 20% above and below 6, is acquired and the reference data is updated. The detailed embodiment thereof is described below.

Meanwhile, when the four parameters SID, NID, BSID, and Ref_PN are matched, but a PN, which does not exist in the PN list of the database of a corresponding pCELL ID, exists only in the result data of location measurement, it is added to the database, the pilot phase and signal intensity for a new PN are stored, thereby updating the database at step S508.

If, as the comparison of step S504, at least one of SID, NID, BSID and Ref_PN is not matched, the result data of location measurement is stored in a separate group within the database of a corresponding pCELL ID at step S510. This is to make a database even in consideration of hand off situations which may occur in a corresponding pCELL, thereby improving the integrity of the database. The detailed embodiment of this is described below.

The detail embodiment of step S506 is described with reference to FIGS. 10 and 11 in detail.

As illustrated in FIG. 10, a mobile terminal, which uses an A-GPS-based location measurement service is located in the common region of three base transceiver stations 200, 210, 220. Each of the base transceiver stations is divided into three sectors depending on the mobile communication service area. In this case, BTS sectors collected by the mobile terminal are PN2, PN4, and PN7, and, if it is assumed that a sector currently providing services is PN2 among them, the PN2 becomes Ref_PN and PN4 and PN7 become Measurement PNs.

At the current location, the results of the A-GPS location measurement of the mobile terminal are stored in the PDE as log files, the result data [B] of location measurement as illustrated in FIG. 11 is transmitted to the network-based location measurement server when the pCELL database is updated. Since there are 6 pieces of fundamental data [A] having the same PN within the database of a corresponding pCELL ID, the pilot phase and signal intensity values of the result data [B] of location measurement are stored as the seventh, after the fundamental data [A].

Thereafter, reference data [C] is generated by calculating the average value between pilot phase and signal intensity values for the respective PNs of 6 pieces of fundamental data [A] and the newly transmitted seventh result data [B] of location measurement, and is separately stored. In this case, since the number of pieces of fundamental data [A] previously stored is six, the average value with the result data [B] of location measurement using the remaining values excluding maximum and minimum values among them, thereby generates reference data [C]. Such generated reference data [C] becomes comparison data when location measurement according to the present invention is requested, and the 7 pieces of data [A,B] are used as fundamental data for calculation of the average value upon updating in future. The number of such pieces of data is generally up to 10.

As described above, the present invention stores a plurality of pilot phase and signal intensity values for respective PNs for data having the same SID, NID, BSID and Ref_PN, calculates an average value between them and newly measured data, and generated reference data, thereby improving the integrity of the data. If one piece of reference data [C] is stored and the average value between it and newly transmitted result data [B] of location measurement is calculated, thereby updating reference data [C], the reliability of a database is degraded when a data value which is considerably different from a reference value due to measurement error is transmitted, and, it causes important reason for error in location measurement.

Next, a concrete embodiment of step S510 is described in detail with reference to FIGS. 10 and 12.

As illustrated in FIG. 10, a mobile terminal moves to a base transceiver station BSID 210 within one area, and a sector (Ref_PN) providing mobile communication services is changed from PN2 to PN4. When the hand-off situation occurs, BSID and Ref_PN which are the result data [B] of location measurement, become different from basic data [A] as illustrated in FIG. 12. Therefore, the result data [B] of location measurement is not identical to the basic data [A] in view of any one of the SID, NID, BSID and Ref_PN thereof. The result data [B] of location measurement is stored in another group (group 2), which is different from the basic data [A] group (group 1), thereby making a database. According to the present invention, it is possible to manage such a group up to maximally 12 for each lattice of the pCELL.

In a conventional network-based location measurement method, data is not managed in detail in consideration of such a hand-off situation, so that there is a problem in that the matching rate with various types of location measurement data generated in the same region is degraded, thereby reducing the accuracy of location measurement. The present invention employs the above-described grouping system, and resolves the above described problem, thereby improving the integrity of the database.

Meanwhile, the present invention reflects variation in BTSs within a mobile communication network to the pCELL database in order to optimize the database. The variation in BTSs occurs due to cell optimization (cell planning) by the provider of a mobile communication network, and includes the addition of a BTS, the change of a BTS, the elimination of a BTS, the addition of a MSC according to incensement of subscribers and within a BTS, and the change of the name of a MSC within a specific BTS.

In order to maintain an optimal database, it needs to also change pCELL data belonging to a changed BTS when variation in the BTS occurs. The present invention is constructed such that the pCELL database can be changed depending on the variation in the BTS in conjunction with a central management system.

As illustrated FIG. 13, a Central Management System (CMS) 66 manages information about all base transceiver stations and all controllers included in Base transceiver stations (BSMs) in conjunction with the BSMs 64 for managing Base transceiver station Controllers (BSC) 62 included in the Mobile Switching System (MSC) of FIG. 1 and Base Transceiver Systems (BTSs) 60.

The present invention is constructed such that the CMS 66 receives information about variation in Base transceiver stations from the BSMs among the information, and provides the information to the network-based location measurement server 68 if required.

The network-based location measurement server 68 may be operated using a method of examining whether there is variation in BTS information which is reported by the CMS 66 at the same predetermined time every day in order to reflect variation in BTSs generated depending on the states of subscribers of the mobile communication network to the pCELL database, or a method of being reported by the CMS 66 immediately when variation in BTSs occurs and reflecting whether variation in BTSs occurs to the pCELL database.

A process of reflecting the variation in BTSs to the pCELL database according to the present invention is described with reference to FIG. 14.

First, the network-based location measurement server receives information about variation in BTSs which is generated in a mobile communication network, from the CMS 66 at step S600. The information may be transmitted from the CMS 66 at the same predetermined time every day or be transmitted from the CMS 66 in real time whenever variation in BTSs occurs.

If, as a result of searching for transmitted information, a BTS (including a MSC) is eliminated, the network-based location measurement server searches for all pCELL IDs (lattices) established based on corresponding BTSs (MSCs) within the pCELL database and then deletes all information generated based on the corresponding BTSs (MSCs) among group information stored in the corresponding IDs.

If, as a result of searching for transmitted information, a BTS (including a MSC) is additionally provided, the network-based location measurement server establishes the pCELL database using a log file about the results of A-GPS location measurement for a predetermined time (for example, a week) or a certain time (which is identical to or less than a set time) after the time set by an operator at steps S606 and S608. A method of updating the database in future is the same as the above-described method.

If, as a result of searching for transmitted information, there is a variation in a BTS (including a MSC), the elimination and addition of a BTS are performed simultaneously. In other words, an existing BTS is eliminated according to the above-described elimination process and a new BTS is additionally provided according to the above-described addition process at steps S610 and S612.

In such a way, the present invention is constructed to continuously update data using the results of A-GPS location measurement and directly reflect variation in BTSs to a database, so that the database is optimally maintained.

Although the preferred embodiments of the present invention are described based on CDMA as a mobile communication system to which the network-based location measurement method using the pCELL database of the present invention is applicable, the present invention is not limited to them. Those skilled in the art can understand that the present invention is applicable to GSM, W-CDMA, or WiBro as a location measurement method for provision of location based services besides CDMA. Wibro is wireless broadband portable Internet to be commercialized in future, which enables a user to use high-speed Internet while moving.

In the present invention, time and distance measurement data which are parameters measured by a mobile terminal or a mobile communication network in the pilot phase of PPM in CDMA, are the observed time difference (OTD) of synchronization burst signals received from BTSs in GSM, or are the SFN-SFN observed time difference (or UE RX-TX time difference) of a downlink signal transmitted from a base transceiver station to a terminal through a common pilot channel (CPICH) in WCDMA, thereby being applied to a location measurement method.

The above-described network-based location measurement method using pCELL databases of the present invention can be implemented in a computer readable recording medium as computer readable codes. The computer readable recording medium includes all types of recoding apparatuses in which programs or data readable by a computer system are stored. Examples of the computer readable recording medium include ROM, RAM, CD-ROM, magnetic tapes, hard disk, floppy disks, flash memory, optical data storing apparatus, or the like. In this case, programs stored in the recording medium means what is represented by a series of commands directly or indirectly used in an apparatus having information processing capability, such as a computer, in order to acquire specific results. Therefore, the term computer is used to include all apparatuses, which include memory, input/output devices, and operation devices and have information processing capability, in order to perform a specific function using a program regardless of the meaning thereof actually used.

Furthermore, the network-based location measurement method using the pCELL database according to the present invention may be implemented using a programmable integrated circuit, for example, FPGA (Field Programmable Gate Array) which is made through schematic or VHSIC hardware description language (VHDL) in a computer and is connected to the computer. The recording medium includes such programmable integration circuits. Furthermore, the recording medium is used to include an ASIC (application specific integrated circuit) in which the network-based location measurement method is implemented in a platform by integration circuits in a LBS system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A network-based location measurement method using a pCELL database, comprising the steps of:
    (a) establishing a pCELL database in which a location measurement service target area is divided into lattices each having a predetermined size;
    (b) continuously determining whether a request for location measurement occurs by a service subscriber; and
    (c) when the request for location measurement is generated, comparing fundamental information received from a mobile terminal with the pCELL database, determining a matching pCELL, and reporting the matching pCELL to the service subscriber;
    wherein the step of determining the matching pCELL in step (c) comprises:
    (c1) selecting pCELL candidates from the pCELL databases using data required to search for the pCELL from data measured by the mobile terminal;
    (c2) selecting pCELLs remotely located compared to a predetermined reference location from among the selected pCELL candidates and excluding the selected pCELLs which were remotely located from the pCELL candidates;
    (c3) determining a pCELL to be the matching pCELL, from the pattern which best matches the data received from the mobile terminal from among the remaining pCELL candidates; and
    (c4) reporting and transmitting latitude and longitude of the matching pCELL to the service subscriber.

2. The network-based location measurement method as set forth in claim 1, wherein the step (a) comprises the steps of:
    (a1) dividing the location measurement service target area into lattices each having a predetermined size, and assigning pCELL IDs each having characteristic information to each of the lattices, respectively;
    (a2) collecting results of location measurement for each of the pCELL IDs; and
    (a3) selectively extracting required parameters from the collected results of location measurement for each of the pCELL IDs and establishing the pCELL database.

3. The network-based location measurement method as set forth in claim 2, wherein, in the step (a1), the characteristic information to each of the lattices comprises latitude and longitude data of central points and surrounding vertexes of each of the lattices.

4. The network-based location measurement method as set forth in claim 2, wherein the step (a2) comprises the step of logging results of location measurement of a subscriber of a satellite location measurement service currently provided, thereby collecting the results of location measurement for each of the pCELL IDs.

5. The network-based location measurement method as set forth in claim 2, wherein the step (a2) comprises the step of logging results of location measurement of a subscriber of a network-based location measurement service currently provided, thereby collecting the results of location measurement for each of the pCELL IDs.

6. The network-based location measurement method as set forth in claim 2, wherein the step (a2) comprises the step of logging results of location measurement through manual labor, thereby collecting the results of location measurement for each of the pCELL IDs.

7. The network-based location measurement method as set forth in claim 2, wherein the step (a2) comprises the step of logging results of network-based location measurement through manual labor, thereby collecting the results of location measurement for each of the pCELL IDs.

8. The network-based location measurement method as set forth in claim 1, wherein the step (c2) comprises the step of detecting pCELLs, of which the distance from the central point of the cell exceeds a predetermined value, and excluding the detected pCELLs from the pCELL candidates.

9. The network-based location measurement method as set forth in claim 1, wherein the step (c2) comprises the step of detecting pCELLs, of which the distance from the central point of the cell exceeds the average distance of the pCELL candidates from the central point of the cell, and excluding the detected pCELLs from the pCELL candidates.

10. The network-based location measurement method as set forth in claim 1, wherein the step (c3) comprises the step of assigning weights depending on the degree of matching of at least one of a system ID, a network ID, a BTS ID, and a reference sector ID.

11. The network-based location measurement method as set forth in claim 1, wherein the step (c3) comprises the step of assigning weights depending on the degree of matching between a sector ID measured by the mobile terminal and a sector ID of the pCELL database.

12. The network-based location measurement method as set forth in claim 1, wherein the step (c3) comprises the step of assigning weights depending on the degree of matching between time and distance parameters for each sector of a BTS measured by the mobile terminal, and time and distance parameters for an identical sector of the pCELL database in predetermined steps.

13. The network-based location measurement method as set forth in claim 1, wherein the step (c3) comprises the step of assigning weights depending on the degree of matching between intensity of a pilot signal for each sector measured by the mobile terminal, and intensity of a pilot signal for an identical sector of the pCELL database in predetermined steps.

14. The network-based location measurement method as set forth in claim 1, wherein the step (c) further comprises the steps of:
- (c5) after step (c1), determining whether there are the selected pCELL candidates and proceeding to the step (c2) when there are the selected pCELL candidates; and
- (c6), when it is determined that there is no pCELL candidate, reporting latitude and longitude data of the mobile terminal, which are measured using a network-based trilateration method, to the service requester.

15. The network-based location measurement method as set forth in claim 14, wherein the step (c6) further comprises the step of calculating a central point of a cell in which the mobile terminal is located and central points of two neighboring cells, calculating a central point between the three vertexes of triangle which is composed of the three central points and then using it as the results of the location measurement.

16. The network-based location measurement method as set forth in claim 1, wherein the step (c) further comprises the steps of:
- (c5) after step (c1), determining whether there are selected pCELL candidates and proceeding to the step (c2) when there are selected pCELL candidates; and
- (c7) when it is determined that there is no pCELL candidate, performing location measurement using satellites around an area in which a request for location measurement is generated or using a manual location measurement method, and adding pCELL databases which are empty for each of base stations.

17. The network-based location measurement method as set forth in claim 1, further comprising the step of:
- (d) updating the pCELL database using the results of location measurement of a subscriber of a satellite location measurement service currently provided.

18. The network-based location measurement method as set forth in claim 17, wherein the step (d) comprises the steps of:
- (d1) parsing a data file in which logs the results A-GPS location measurement of the subscriber of the satellite location measurement service currently provided, and finding out a corresponding pCELL ID in the pCELL database;
- (d2) searching the database of the corresponding pCELL ID, and determining whether the parsed result data of the location measurement is identical to SD, ND, BSID and Ref_PN;
- (d3), when the SD, NID, BSID and Ref_PN are identical to those of the parsed result data, comparing RefPN and measurement PN of the result data of location measurement with all PNs within the database of the corresponding pCELL ID and additionally storing pilot phase and signal intensity values for each PN included in the result data of location measurement for a matching PN in the database of the corresponding pCELL ID; and
- (d4) calculating average values between the pilot phase and signal intensity values for each PN included in the result data of location measurement and pilot phase and signal intensity values of the matching PN in the database of the corresponding pCELL ID and separately storing them in the database of the corresponding pCELL ID.

19. The network-based location measurement method as set forth in claim 18, wherein, the step (d4) comprises the step of selecting some of the matching PN which belongs within a reference range and calculating average value of the pilot phase and signal intensity values for respective PNs included in the result data of the location measurement, when there are at least two of pilot phase and signal intensity values for the matching PN in the database of the corresponding pCELL ID.

20. The network-based location measurement method as set forth in claim 18, further comprising the step (d5), when there is a PN in the result data of the location measurement, which does not exist in the database of the corresponding pCELL ID, additionally storing the PN and pilot phase and signal intensity values thereof in the database of the pCELL ID.

21. The network-based location measurement method as set forth in claim 18, further comprising the step (d6), when, as a result of determination of the step (d2), at least one of SID, ND, BSID and Ref_PN is not matched, storing the pilot phase and signal intensity values for respective PNs included in the result data of the location measurement in the database of the corresponding pCELL ID as a separate group.

22. The network-based location measurement method as set forth in claim 1, further comprising (e) updating the pCELL ID database using information about variation in a BTS within a mobile communication network.

23. The network-based location measurement method as set forth in claim 22, wherein the step (e) comprises the steps of:
- (e1) receiving information about the variation in a BTS from a management system of the mobile communication network;
- (e2) when, as a result of searching for information about the variation in a BTS, the BTS is eliminated, deleting information about the eliminated BTS in the pCELL database;
- (e3) when, as a result of searching for information about the variation in a BTS, a BTS is added, establishing a database of a corresponding pCELL ID using results of A-GPS location measurement of a subscriber of a satellite location measurement service currently provided after a predetermined time; and
- (e4) when, as a result of searching for information about the variation in a BTS, variation in a BTS occurs, performing the step (e2) on an existing BTS, and performing the step (e3) on a new BTS.

24. A computer readable recording medium using a network-based location measurement method as set forth in any one of claims 1 to 7 and 8 to 23.

* * * * *